Patented Oct. 15, 1929

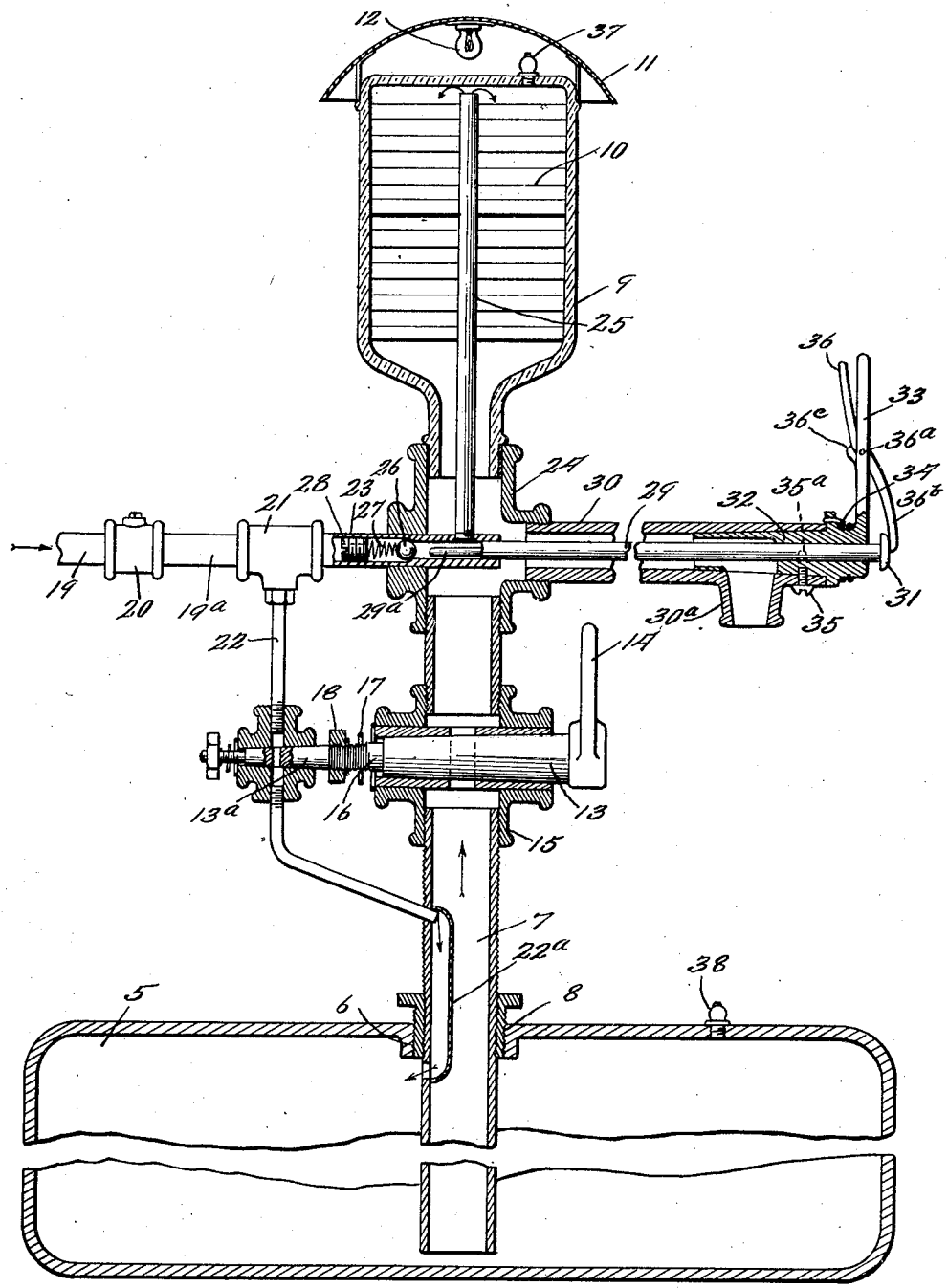

1,732,109

UNITED STATES PATENT OFFICE

LEWIS W. PHELPS, OF CHICAGO, ILLINOIS, AND HARRY T. HASKINS, OF DENVER, COLORADO; SAID HASKINS ASSIGNOR TO SAID PHELPS

OIL DISPENSER

Application filed September 10, 1928. Serial No. 304,904.

Our invention relates to equipment for dispensing liquids, and more particularly to appliances used in garages and oil stations for the dispensing of oil, alcohol and like commodities, and our main object is to provide an appliance which enables the patron to see the product as it leaves its reservoir and know that the desired quantity is being measured before his eyes.

A further object of the invention is to so design the novel apparatus that it may be installed in units such as for different brands or grades of oil.

A still further object of the invention is to construct the appliance compactly, so that it may be applicable to portable installation.

Another object of the invention is to so design the same that it may receive pressure from a single air connection.

A significant object of the invention is the provison of a display element in the form of a dome light, which illuminates the liquid and makes the same attractive.

A final, but nevertheless important object of the invention is to build the same of few and simple parts, in order that its cost may be low and its operation easy for the average attendant to understand.

With the above object in view and any others which may suggest themselves from the description and claims to follow, a better understanding of the invention may be gained by reference to the accompanying drawing, in which a vertical section of the apparatus, partly in elevation, is shown.

On the subject of equipment for garages and oil stations, it is a frequent occurrence to find that the gasoline is visibly measured as it falls in its glass container as it is being dispensed. However, no provision has to my knowledge been made for visible and measured dispensing of lubricating oils or antifreeze solutions, such as denatured or specially prepared alcohol. I am aware of the existence of glass containers for lubricating oil and also of glass passage tubes for the same, together with illuminating means to lend luminosity. However, no device seems to have been provided to enable the motorist to watch the oil as it is measured and dispensed to know that he is receiving the proper quantity of oil; also, the various brands and grades of oil have not been brought to light for the appreciation of the patron, and it is my intention to provide an apparatus in which the objects enumerated above may be accomplished to their fullest extent.

By specific reference to the drawing, it will be noted that we have provided a supply tank 5 for the oil, the showing of the same being broken away to save space. This tank may be the typical 50-gal. drum in which lubricating oil is generally delivered to the stations; however, it is immaterial what the size of the tank or drum may be as long as it has provison for the application of our dispensing apparatus. This provision is usually in the form of a tapped opening 6 in the top. The pipe 7 which leads the oil from the tank is lowered into the same through the opening 6, and fixed by screwing down an intermediate bushing 8. The pipe descends to within an inch or thereabouts from the bottom of the tank.

On its way upwards, the pipe 7 leads in general into an inverted bottle 9 of glass, in which the oil is intended to rise as it is fed from the tank, and to fall as it is dispensed. The bottle is graduated with suitable lines 10 to denote standard quantities, such as pints, quarts, etc., the reading progressing downwardly. Thus, as the oil is dispensed, it is an easy matter for the patron to watch the amount of fall in the bottle and thus determine whether he is receiving the proper amount of oil. The bottle is fitted with a capping dome 11, containing an electric light 12. The inner surface of the dome is painted white or silver so that the light will be reflected downwardly through the oil, lending the same a luminous and attractive effect.

On its way up in the pipe 7, the oil has a general shut-off in the form of a plug valve 13, having a handle 14. This valve resembles a simple gas cock, and acts to fully shut off the oil when the handle 14 is given a quarter turn. We prefer that the handle 14 indicate the condition of the valve, and therefore arrange the same parallel with the bore 15 of the same. Thus, with the handle 14 in vertical position, the indication is that the valve is open; and it follows that when the handle has been swung a quarter turn, the valve will be closed. The spindle of the valve is extended as indicated at 16 to receive the usual spring 17 and retaining nut 18, so that the plug valve 13 may be held snugly in its seat at all times.

We secure the feed into the pipe 7 by an air pressure lead from the tire pump equipment usually found in garages and oil stations. The air lead, which is commonly one of high pressure is indicated at 19, but for the purposes of our invention, we provide the same with a pressure-reducing valve 20, so as to cut the pressure down to 10 to 20 lbs. in very cold weather, or 5 to 10 lbs. for the summer season, it being understood that this variance is due to the difference in the flow of the oil under varying temperatures. Beyond the pressure-reducing valve, which may be of any standard make, the lead 19 takes the form of an extension 19ª, the latter leading into a T-fitting 21.

One branch of this fitting leads the air into a piping 22 which extends over to the pipe 7, takes the form of a by-pass 22ª, and opens through the side of the pipe 7 into the top of the tank as clearly shown. The piping 22 passes through a plug valve 13ª, similar to but smaller than, the oil valve 13 previously described; also, both valves are integral and synchronous, so that the handle 14 opens and closes the oil and the air pressure simultaneously. Another branch of the fitting 21 is shown at 23, the same extending into one end of a Greek cross fitting 24. This fitting is interposed between the oil pipe 7 and the measuring bottle 9, receiving the oil pipe in its lower end and the bottle in its upper end. A vertical tube 25 leads from the branch 23 upwardly into the bottle, the upper end of the tube being open and in close proximity to the top of the bottle. It is our intention to admit air under pressure into the bottle by way of the branch 23 and the tube 25, such air entering the bottle over the body of oil therein to exert pressure on the latter. The control of the air for this purpose is centered in a ball valve 26 disposed in the branch 23 and held to a seat therein by a spring 27 and tubular backing screw 28 for the spring, the ball seating in the direction of the air flow. In order to push the ball 26 for the admittance of air into the tube 25, we employ a plunger 29 in a housing 30 which branches from the remote end of the fitting 24. The plunger 29 has a button-type of head 31 at its outer end, and is slidably disposed in the inner end of the branch 23. This portion of the plunger has a pin reduction 29ª which extends to a point near the ball valve 26, so that when the head 31 of the plunger is pushed to advance the latter, the pin 29ª will impinge upon the ball valve 26 to unseat the same and permit air under pressure to pass into the tube 25 by way of the branch 23, and to exert pressure upon the body of oil in the bottle 9 as previously suggested.

The housing 30 is generally in the form of a pipe, having its outer end open and being made with a short downward branch 30ª near such end to serve as a spout for oil that may enter the housing 30. The issue of oil from the housing into the spout is controlled by a plug valve 32 equipped with a radial handle 33. As shown, the vertical position of this handle in an upward direction indicates the open position of the plug valve whereby a passage is had for the oil from the housing 30 to the spout 30ª. The plug valve 32 is designed to close when the handle 33 has been swung through a quarter-turn; and we have provided a torsion spring 34 suitable to retain the handle in position to keep the valve closed normally, so that no oil may accidentally escape from the housing 30. The motion of the plug valve is limited by a screw 35 directed from the housing into a peripheral groove 35ª cut in the valve, the groove being approximately 90 degrees in length, so that the motion of the valve is positively controlled as to its extent.

The plug valve 32 is longitudinally bored for the passage of the plunger 29, as shown, and the handle 33 is provided with a lever 36ª effective upon the head of the plunger 29 with the same hand that holds the lever 33. As shown, the lever 36 is pivoted at 36ª through the lever 33 whereby to locate its lower portion 36ᵇ over the head 31 of the plunger 29. Thus, a clinching grasp of the lever 36 and the handle 33 will press upon the head 31 to operate the plunger as previously described. The handle 33 is fitted with a stop lug 36ᶜ to prevent the lever from departing from the position of use.

In the operation of the apparatus, the compound valve 13, 13ª may be considered as closed, and the same of course applies to the air valve 26. In order to set the apparatus in readiness for use, the handle 14 is swung to open the compound valve 13, 13ª. Air under low pressure is thus admitted over the oil in the tank 5 with the effect of forcing oil up into the main pipe 7. Since the plug valve 13 is open, the oil will rise into the fitting 24 and the bottle 9 to fill the latter. Incidentally, the oil will also fill the air tube 25 and the chamber of the branch 23 in which the pin 29ª is located; also, the oil will fill the housing 30. The handle 14 may now be closed, as the bottle 9 has a sufficient filling for service. The apparatus is now ready for the dispensing action, which ensues when a suitable vessel is held under the spout 30ª, the handle 33 is swung up to open the plug valve 32, and the lever 36 is momentarily clutched with the hand to press on the plunger 29. This action unseats the ball valve 26 and permits air under pressure to flow through the branch 23 into the tube 25 and to force the oil in the bottle down so as to rapidly issue from the spout 38 into the vessel held by the attendant. As the oil falls in the bottle, the attendant and the patron will be in a position to observe the amount dispensed. The presence of the branch 23 and the tube 25 will not impair the accuracy of the flow, as these parts will be of a very small gage and contain a negligible quantity of oil.

In the drawing we have not attempted to impart accuracy of construction or design but merely to illustrate the principle involved in our invention. Therefore, it will be understood that the apparatus will in practice be designed more compactly and with a construction which will make for simplicity, durability and efficiency in operation, such construction being within the knowledge of those skilled in the particular art.

It will be seen that the novel apparatus accomplishes a speedy operation with the minimum of parts and designed so as not to require a large quantity of oil to be held in the service container. Thus, when the latter has become exhausted, it may be readily filled by the momentary operation of the arm 14. Since the bottle 9 may contain sufficient oil to last for several hours and even longer, it will be seen that the attendant will resort to the filling operation infrequently, so that the same may be said to require little attention. The apparatus is so designed that it may be made in a unit for grouping with a number of other installations of the same character in a compact system, so that not very much room will be required to set up an array of oils of different grades or brands, all of these being in plain view of the passing motorist.

Also, the apparatus is of such a character that it may be built as a portable unit and carried from place to place, only requiring a handy air pressure line to be ready for service.

As a matter of precaution, we believe it fit to provide the bottle 9 with a relief valve 37, and the oil tank 5 with a similar valve 38, these valves to act automatically to relieve excess pressure and thus maintain the apparatus safe at all times.

We claim:—

1. An oil dispenser comprising an oil reservoir, a visual measure, a duct from the reservoir into the measure, an air pressure lead effective over the oil body in the measure, a check valve in said lead, a branch housing adjacent to the latter, a rotary valve operable in the housing, a discharge spout controlled by the rotary valve and communicating with the measure, and a control plunger for the check valve passing through the rotary valve.

2. An oil dispenser comprising an oil reservoir, a visual measure, a duct from the reservoir into the measure, an air pressure lead effective over the oil body in the measure, a check valve in said lead, a branch housing adjacent to the latter, a rotary valve operable in the housing, a handle to actuate the rotary valve, a discharge spout controlled by the rotary valve and communicating with the measure, a control plunger for the check valve passing through the rotary valve, and a hand-lever, carried by the handle and operable to actuate the plunger so as to open the check valve.

3. An oil dispenser comprising an oil reservoir, a visual measure, a duct from the reservoir into the measure, an air pressure lead effective over the oil body in the measure, a check valve in said lead, a branch housing adjacent to the latter, a rotary valve operable in the housing, a handle to actuate the rotary valve, a discharge spout controlled by the rotary valve and communicating with the measure, a resiliently tensioned control plunger for the check valve passing through the rotary valve, and a hand-lever pivoted in the handle and adapted to be clutched with the same hand to actuate the plunger so as to open the check valve.

In testimony whereof we affix our signatures.

LEWIS W. PHELPS.
HARRY T. HASKINS.